UNITED STATES PATENT OFFICE.

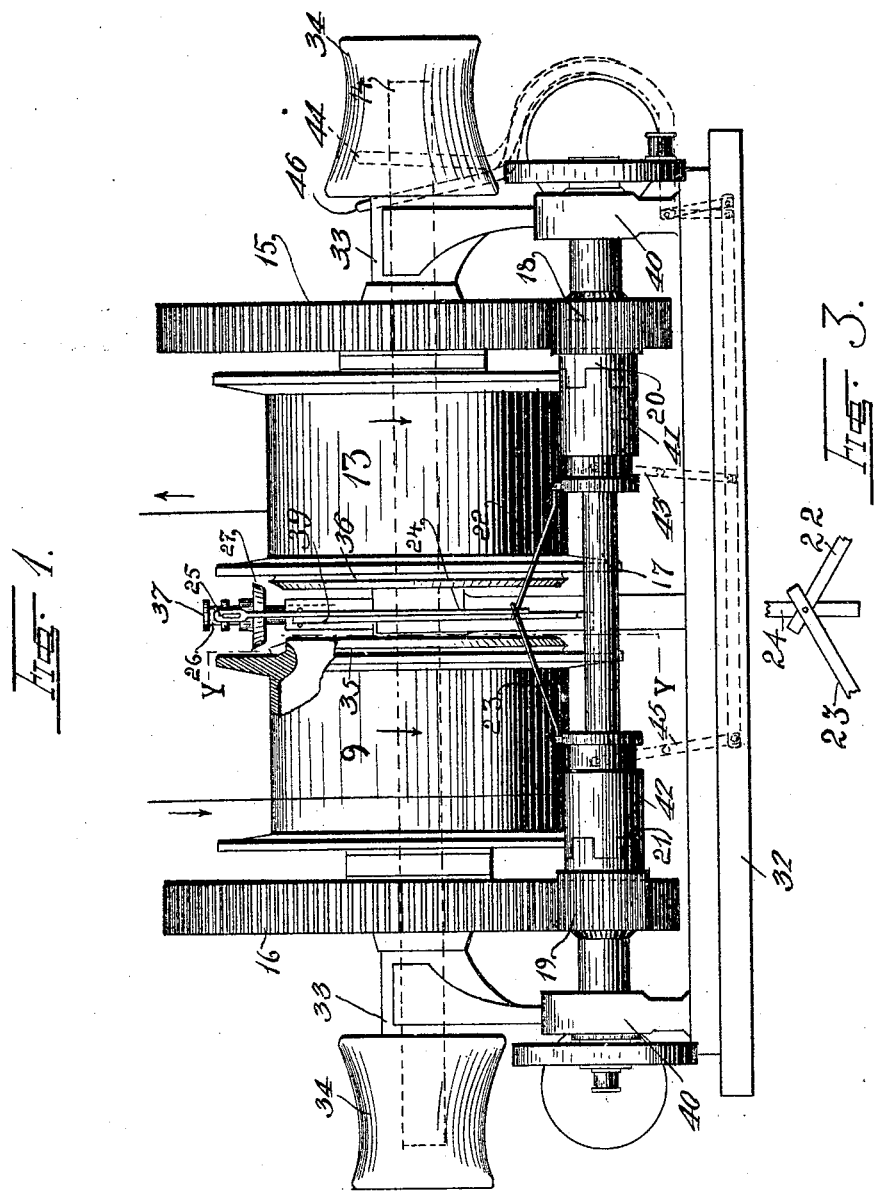

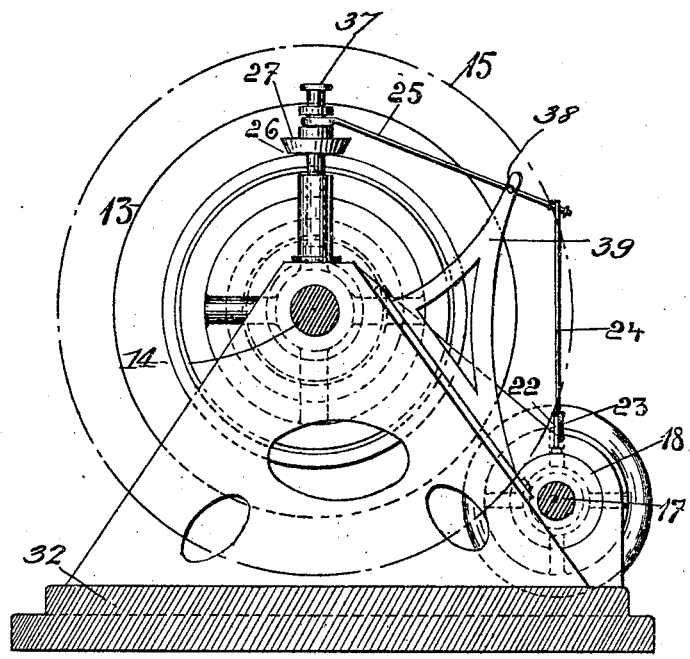

PAUL WILHELM SIEURIN, OF GOTTENBORG, SWEDEN.

WINCH.

945,478.  Specification of Letters Patent.  Patented Jan. 4, 1910.

Application filed April 27, 1908. Serial No. 429,577.

*To all whom it may concern:*

Be it known that I, PAUL WILHELM SIEURIN, a subject of the King of Sweden, and resident of Gottenborg, Sweden, have invented a certain new and useful Improvement in Winches, of which the following is a specification.

This invention relates to winches of the kind having two drums rotatable relatively to one another on a shaft or on separate shafts, each being provided with a toothed gear which meshes with another toothed gear, said last mentioned gears being each adapted to be coupled and uncoupled with a driving shaft by means of a clutch.

The novelty of the invention consists primarily of a friction gear or the like which is movable into and out of engagement with the drums and is such as to enable either drum to be reversely driven from the other when one or both clutches is or are disengaged, but can be moved out of engagement with the drums when both the clutches are engaged so that both drums are being driven direct from the driving shaft.

In the annexed drawing which illustrates the invention the Figure 1 is an elevation, Fig. 2 a section on line Y—Y of Fig. 1 showing a winch embodying the improvements. Fig. 3 is a detail elevation.

As shown 9 and 13 are the drums, one 9 of which is fixed and the other 13 is loosely mounted on the same shaft 14. Both drums may, however, be loosely mounted on said shaft or mounted on separate shafts, if desired. Around each drum is coiled a rope or the like, the ropes being coiled in opposite directions and having their free ends connected to a common hook to which the load is attached. The ropes are not shown in the drawings. The drum 13 is provided with a toothed gear 15 and the drum 9 with a toothed gear 16. These toothed gears 15 and 16 respectively mesh with toothed gears 18 and 19 loosely mounted upon a driving shaft 17, clutches 20 and 21 being provided for coupling the gears 18 and 19 respectively to the said shafts. On these clutches are arranged arms 22, 23 pivoted to a rod 24 projecting upward and connected to one arm of a lever 25 which is movable up and down, and the other arm of which is movably connected by means of a fork or the like to a spindle 26 movable up and down in suitable guides. This spindle is located between the two drums and provided with a bevel friction wheel 27 for which suitable friction surfaces are provided on the drums.

When the clutches 20 and 21 are coupled to the toothed gears 18 and 19, they will on account of their connection with the bevel wheel 27 hold this latter out of engagement with the friction surfaces on the drums (Fig. 1). The rod 24 is raised as soon as one of the clutches 20 or 21 is disengaged whereupon the gear 27 is lowered, so that it comes into engagement with the said friction surfaces on the drums and causes the one drum to be reversely driven from the other.

When the load has to be hoisted up and transported outward over the bulwarks the clutch 21 is engaged and the clutch 20 is disengaged so that on the winch engine being set in motion the rope of the drum 9 will be wound up for raising the goods. The rope of the drum 13 will also be wound up to a corresponding degree because the bevel friction wheel 27, being in engagement with the friction surfaces of both drums, transmits motion to the drum 13 with the same speed, but in the opposite direction. When the load has been raised to the proper height the clutch 20 is also brought into engagement, whereupon the bevel wheel 27 is disengaged and, the engine being reversed, both drums are caused to rotate in the same direction, so that the rope of the drum 13 continues to be wound up and the rope of the drum 9 is slackened. The lowering movement takes place, after the disengagement of the clutch 21 which has previously raised the load, and the bevel wheel 27 has thereby been brought into contact with both drums. If the direction of movement of the machine is again reversed, the load is let down by the rope upon the drum 13 and the other rope is let down with the same speed. The hook common to both lines, but not shown, for supporting the load is brought back to the ship's hold on reversing the operation.

The bevel wheel has in all cases only to transmit movement to an unloaded drum so that it is only subjected to inconsiderable strains.

It is evident that the connection between the gear 27 and the clutches and the friction device whereby either drum can be reversely driven from the other can be other than is shown and described.

I claim:—

1. In a winch of the kind described, in combination, two drums rotatable relatively to each other, a gear carried by each drum, a driving shaft, gears on said shaft meshing with the aforesaid drum gears, clutches adapted to put each of said gears in driving connection, means for producing movement of said drums in opposite directions, and connections between said drums and said clutches adapted to render said means operative when either of said clutches is disengaged but inoperative when both said clutches are engaged.

2. In a winch of the kind described, in combination, two drums rotatable relatively to each other, a gear carried by each drum, a driving shaft, gears on said shaft meshing with the aforesaid gears, a clutch for each of said driving shaft gears, and a friction device movable into and out of engagement with the two drums and connected to the clutches so as to be kept out of engagement with the drums when both clutches are engaged but to be brought into engagement with the drums when either of said clutches are disengaged.

3. In a winch of the kind described, in combination, two drums rotatable relatively to each other, a driving shaft, gears on said shaft meshing with the aforesaid gears, a clutch for each of said driving shaft gears, a bevel wheel movable into and out of engagement with the two drums, a movable spindle on which said bevel wheel is mounted, a rod connected to said clutches, and a lever connecting said rod and said spindle, as and for the purpose set forth.

In testimony whereof I have signed my name to this specification in the presence of two subscribing witnesses.

PAUL WILHELM SIEURIN.

Witnesses:
FRITZ ESLAUIN,
HJALMAR ZETURSTROM.